(12) United States Patent
Pikulin et al.

(10) Patent No.: US 12,481,906 B2
(45) Date of Patent: Nov. 25, 2025

(54) MAJORANA-BASED QUBITS IN 3D TOPOLOGICAL INSULATOR FLAKES

(71) Applicant: Microsoft Technology Licensing, LLC, Redmond, WA (US)

(72) Inventors: Dmitry Pikulin, Redmond, WA (US); Roman Lutchyn, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1121 days.

(21) Appl. No.: 17/463,548

(22) Filed: Sep. 1, 2021

(65) Prior Publication Data
US 2024/0403680 A1    Dec. 5, 2024

(51) Int. Cl.
*G06N 10/40* (2022.01)
*G06N 10/20* (2022.01)

(52) U.S. Cl.
CPC .............. *G06N 10/40* (2022.01); *G06N 10/20* (2022.01)

(58) Field of Classification Search
CPC ...................................................... G06N 10/40
See application file for complete search history.

(56) References Cited

U.S. PATENT DOCUMENTS

| 11,010,684 | B2 | 5/2021 | Pikulin | |
|---|---|---|---|---|
| 2017/0345990 | A1* | 11/2017 | Yohannes | H10N 60/0156 |
| 2019/0044066 | A1* | 2/2019 | Thomas | B82Y 40/00 |

FOREIGN PATENT DOCUMENTS

| EP | 2876687 A1 | 5/2015 |
|---|---|---|
| WO | 2019100017 A1 | 5/2019 |

OTHER PUBLICATIONS

Liu, et al., "Robust and Clean Majorana Zero Mode in the Vortex Core of High-temperature Superconductor (Li0.84Fe0.16)OHFeSe", In Repository of arXiv:1807.01278v2, Jul. 3, 2018, 32 Pages.
"International Search Report and Written Opinion Issued in PCT Application No. PCT/US2022/040155", Mailed Date: Dec. 9, 2022, 17 Pages.
Aasen, et al., "Milestones Toward Majorana-Based Quantum Computing", In Journal of Physical Review X, vol. 6, Issue 3, Aug. 3, 2016, 28 Pages.
Hyart, et al., "Flux-controlled Quantum Computation with Majorana Fermions", In Repository of arXiv:1303.4379v3, Jul. 29, 2013, 20 Pages.
Karzig, et al., "Scalable Designs for Quasiparticle-Poisoning-Protected Topological Quantum Computation with Majorana Zero Modes", In Repository of arXiv: 1610.05289v4, Jun. 21, 2017, 34 Pages.
Pikulin, Dmitry I., "Proposal for a Scalable Charging-Energy-Protected Topological Qubit in a Quantum Spin Hall System", In Repository of arXiv:2011.04691v1, Nov. 9, 2020, 6 Pages.

* cited by examiner

*Primary Examiner* — Paul A Wartalowicz
(74) *Attorney, Agent, or Firm* — Ranjeev Singh; Singh Law, PLLC

(57) ABSTRACT

Embodiments of the present disclosure includes qubit architectures and qubit elements of a quantum processor. A superconductor region overlaps a three-dimensional topological insulator layer. A vortex region extends through the superconductor region to the three-dimensional topological insulator layer. A peripheral portion of the vortex region is located on an edge of the superconductor region.

20 Claims, 14 Drawing Sheets

MAJORANA-BASED QUBITS IN 3D TOPOLOGICAL INSULATOR FLAKES

BACKGROUND

The present disclosure relates to a quantum computing system and, more particularly, to structures and techniques for providing topologically protected quantum computation.

Quantum decoherence or "noise" is a difficult obstacle to the large-scale implementation of quantum computing systems. In recent years, a focus of quantum condensed-matter physicists is on Marjorana zero modes (MZMs), which provide fault-tolerant qubits in quantum computing systems. Progress has been made to improve MZM-based quantum computing systems; however, several barriers remain in the way of this technology. For instance, one approach to localizing MZMs is to use magnetic barriers; however, precisely, and effectively implementing such magnetic barriers to manipulate MZMs is challenging.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Embodiments disclosed herein relate to quantum computing systems and, more particularly, to structures and techniques for implementing Majorana zero mode (MZM)-based designs for quantum computing processors. Features disclosed herein provide easier and more versatile fabrication rules that result in practical advantages over at least some previous MZM architectures. One or more embodiments herein combine a two-dimensional ("2D") architecture that is widely available with the charging energy protection that facilitates fault-tolerance in quantum computing systems.

Figure 1:
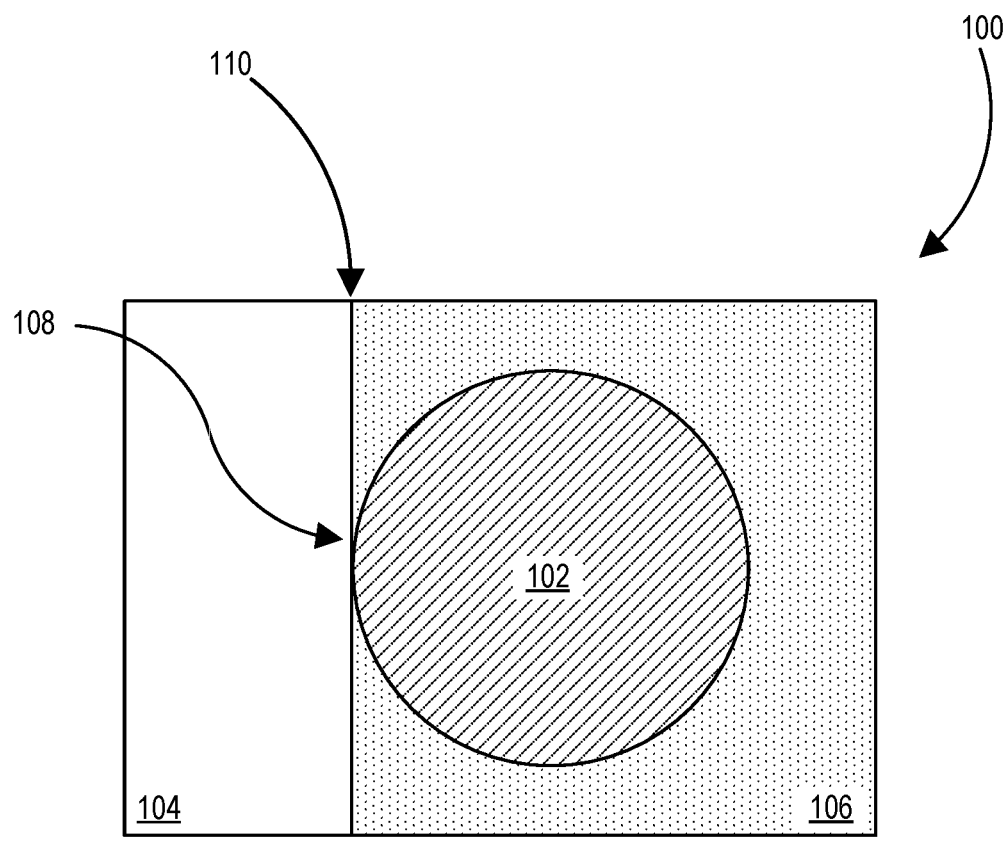
FIG. 1 illustrates a top view of a qubit element of a quantum computing processor according to one or more embodiments.

FIG. 1 illustrates a top view of a qubit element 100 of a quantum computing processor according to one or more embodiments. A qubit element, as referred to herein, is a structure configured to achieve and control quantum states. The qubit element 100 is a multilayer structure that facilitates the entrapment of electromagnetic flux in a vortex region 102. The qubit element 100 includes a first region 104 of magnetic insulator material and a second region 106 provided on the first region 104. The first region 104 is a region of magnetic insulator material in the qubit element 100. The second region 106 is a region of superconductor material. The first region 104 at least partially surrounds the second region 106. The first region 104 abuts or is in contact with a periphery of the second region 106.

The vortex region 102 of the qubit element 100 has a circular shape that extends through the first region 104. In some embodiments, the circular shape of the vortex region 102 is a circle in which a major axis is equal to a minor axis. In some embodiments, the circular shape of the vortex region 102 is an ellipse in which a major axis is different than a minor axis. In some embodiments, the vortex region 102 has a rectangular shape that extends through the first region 104. The rectangular shape is, in some embodiments, a square having sides with equal lengths. In some embodiments, the rectangular shape is a rectangle with a first pair of opposing sides that have a different length than a second pair of opposing sides. In some embodiments, the rectangular shape has beveled vertices connecting adjacent sides. In some embodiments, the vortex region 102 has a polygonal cross-sectional shape (e.g., hexagonal, heptagonal, decagonal) that extends through the first region. In some embodiments, the vortex region 102 extends through the first region 104 to an upper surface of a topological insulator layer described infra in greater detail.

In some embodiments, the vortex region 102 is a cavity of empty space that extends through the first region 104 and the second region 106 to the topological insulator layer. In some embodiments, the vortex region 102 is a region that is different than the surrounding layer and that facilitates the entrapment of electromagnetic flux therein, as described in greater detail further below. The vortex region 102 in such embodiments may, by way of non-limiting example, have a different composition or concentration of materials relative to the surrounding layer.

As a result, one or more electromagnetic properties of the vortex region 102 are different than one or more corresponding electromagnetic properties of the surrounding layer. For instance, the vortex region 102 may have a magnetic permeability that is different than the second region 106 surrounding the vortex region 102. As another example, the vortex region 102 may have a magnetic susceptibility that is different than the second region 106 surrounding the vortex region 102.

The vortex region 102 has a peripheral portion 108 located at an edge 110 of the second region 106. More particularly, the location of the peripheral portion 108 at the edge 110 improves controlled connection or tunneling of an MZM to an exterior of the vortex region 102. In some embodiments, the peripheral portion 108 is an aperture or hole in the edge 110 of the second region 106. In some embodiments, the peripheral portion 108 includes a thin wall or thin-walled portion of the second region 106. The thin wall of the peripheral portion 108 is thinner than other walls between the vortex region 102 and an exterior of the second region 206. The thin wall is sufficiently thin that MZMs can be coupled to an exterior of the of the second region 106 through the peripheral portion 108.

Figure 2A:
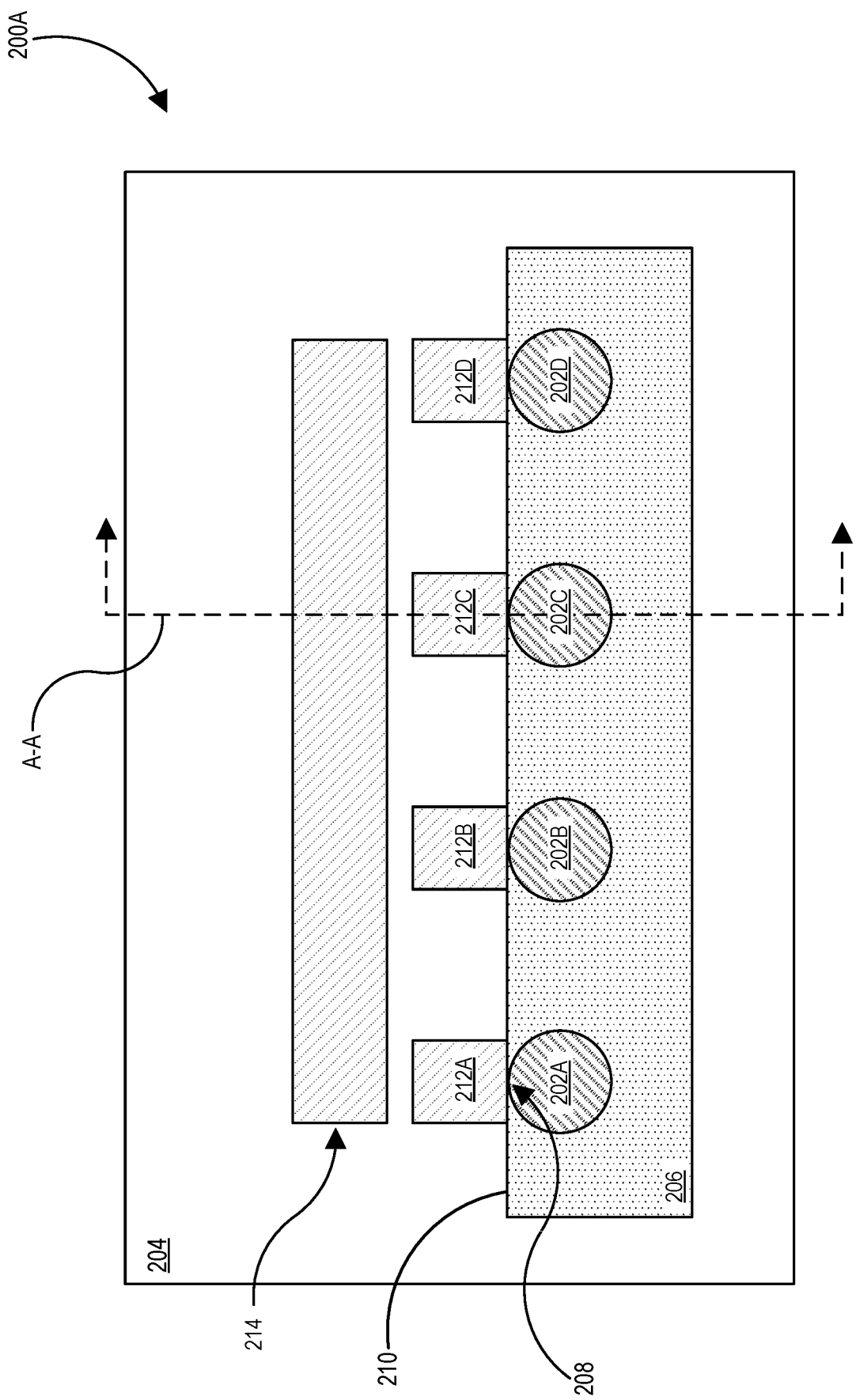
FIG. 2A illustrates a top view of a first arrangement of a one-sided tetron of a quantum computing processor according to one or more embodiments.

FIG. 2A shows a top view of a one-sided tetron 200A that is a qubit element of a quantum computing processor according to one or more embodiments. Several features of the tetron 200A are substantially similar to the qubit element 100 described with respect to FIG. 1 and elsewhere, so repeated description thereof is omitted for brevity. The tetron 200A is a multilayer structure that is operable to selectively entrap electromagnetic flux in four vortex regions 202A, 202B, 202C, and 202D (collectively "vortex regions 202"). The tetron 200A includes a first region 204 of magnetic insulator material corresponding to the first region 104 described with respect to FIG. 1. The tetron 200A also includes a second region 206 of superconducting material corresponding to the first region 104 described with respect to FIG. 1. The vortex regions 202 each include a peripheral portion 208 on or at an edge 210 of the second region 206. The second region 206 extends in a first direction (e.g., horizontally as shown) along the first region 204. Each of the vortex regions 202 has a cross-sectional shape extending through the second region 206. In some embodiments, the cross-sectional shape of the vortex regions 202 may extend partially into a three-dimensional topological insulator layer beneath the second layer 206. The cross-sectional shape of the vortex regions 202 may be circular, rectangular, or polygonal, as described with respect to FIG. 1.

The tetron 200A also includes four gates 212A, 212B, 212C, and 212D (collectively "gates 212") that are respectively adjacent to or near the vortex regions 202A, 202B, 202C, and 202D along the edge 210 of the second region 206. A gate 212 is considered to be near a vortex region 202 if, as a result of activation of tunneling in a three-dimensional topological insulator discussed with respect to FIGS. 3A through 3C and elsewhere herein, an MZM in the vortex region 202 is coupled to a region exterior to the vortex region 202, such as a quantum dot. A gate 212 may be spaced apart from the edge 210 of the second region 206 and still be considered to be near the vortex region 202. The vortex regions 202 are arranged along the first direction and spaced apart from each other such that an electromagnetic field in one of the vortex regions 202 is insulated from an adjacent vortex region 202. The gates 212 are adjacent to the peripheral portion 208 of the vortex region 202C and the edge 210. In some embodiments, a portion of the gates 212 abut the edge 210 of the second region 206 at the peripheral portions 208. The gates 212 are a region of semiconductor material in at least some embodiments.

In some embodiments, one or more of the peripheral portions 208 of the vortex regions 202 include a thin wall or thin-walled portion that is thinner than other walls of the second region 206 between the vortex regions 202 and an exterior of the second region 206. In some embodiments, one or more of the peripheral portions 208 of the vortex regions 202 include an aperture extending through the second region 206 to the first region 204. In some embodiments, one or more of the peripheral portions 208 include an aperture and one or more of the peripheral portions 208 include a thin wall. As a result, precision in the fabrication process of the tetron 200A may be reduced without significantly altering performance of the tetron 200A.

Each of the gates 212 is a tunnel barrier that is selectively and individually controllable to transition between a first state and a second state, the first state in which an electromagnetic field in an adjacent vortex region 202 is insulated or prevented from tunneling through a three-dimensional topological insulator (see, e.g., FIG. 3A), and the second state in which an electromagnetic field in an adjacent vortex region 202 is permitted to tunnel through the three-dimensional topological insulator. In some embodiments, the gates 212 include a magnetic insulator portion and a local gate portion described in greater detail below.

The tetron 200A further includes a quantum dot region 214 extending along the first direction with the gates 212 between the quantum dot region 214 and the vortex regions 202. In some embodiments, the quantum dot region 214 may extend in parallel with the second region 206. Quantum dots of the quantum dot region 214 are defined by the gates 212 that are adjacent to the quantum dot region 214. The quantum dot region 214 that is gated differently than a surrounding region of the three-dimensional topological insulator. The quantum dot region 214 is spaced apart from the second region 206 on the first region 204. The quantum dot region 214 facilitates measurements of quantum states of the qubit elements of the tetron 200A. The quantum dot region 214 may include several subregions that each correspond to a separate quantum dot. A quantum state of the qubits (e.g., vortex regions 202) of the tetron 200A can be measured on one or more of the quantum dots of the quantum dot region 214 via operation of the gates 212, as discussed in detail infra herein.

Figure 2B:
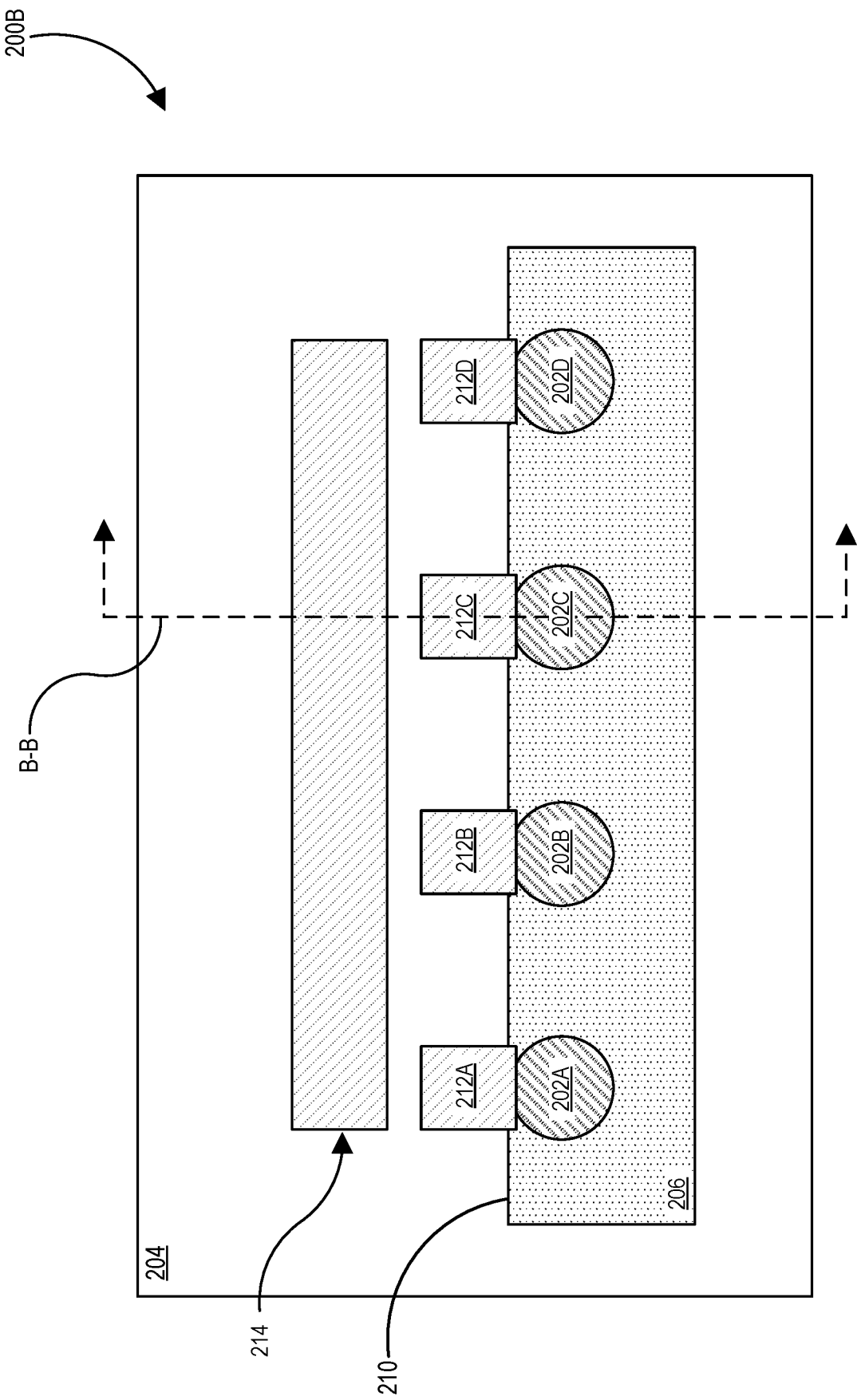
FIG. 2B illustrates a top view of a second arrangement of a one-sided tetron of a quantum computing processor according to one or more embodiments.

FIG. 2B shows a top view of a second arrangement of a one-sided tetron 200B that is a qubit element of a quantum computing processor according to one or more embodiments. Several features of the tetron 200B are substantially similar to the tetron 200A, so repeated description thereof is omitted for brevity. The four gates 212A, 212B, 212C, and 212D of the tetron 200B are near the vortex regions 202A, 202B, 202C, and 202D at the edge 210. In particular, the gates 212A, 212B, 212C, and 212D respectively overlap at least a part of the vortex regions 202A, 202B, 202C, and 202D, respectively, at the edge 210, as discussed infra with respect to FIG. 3C.

Figure 3A:
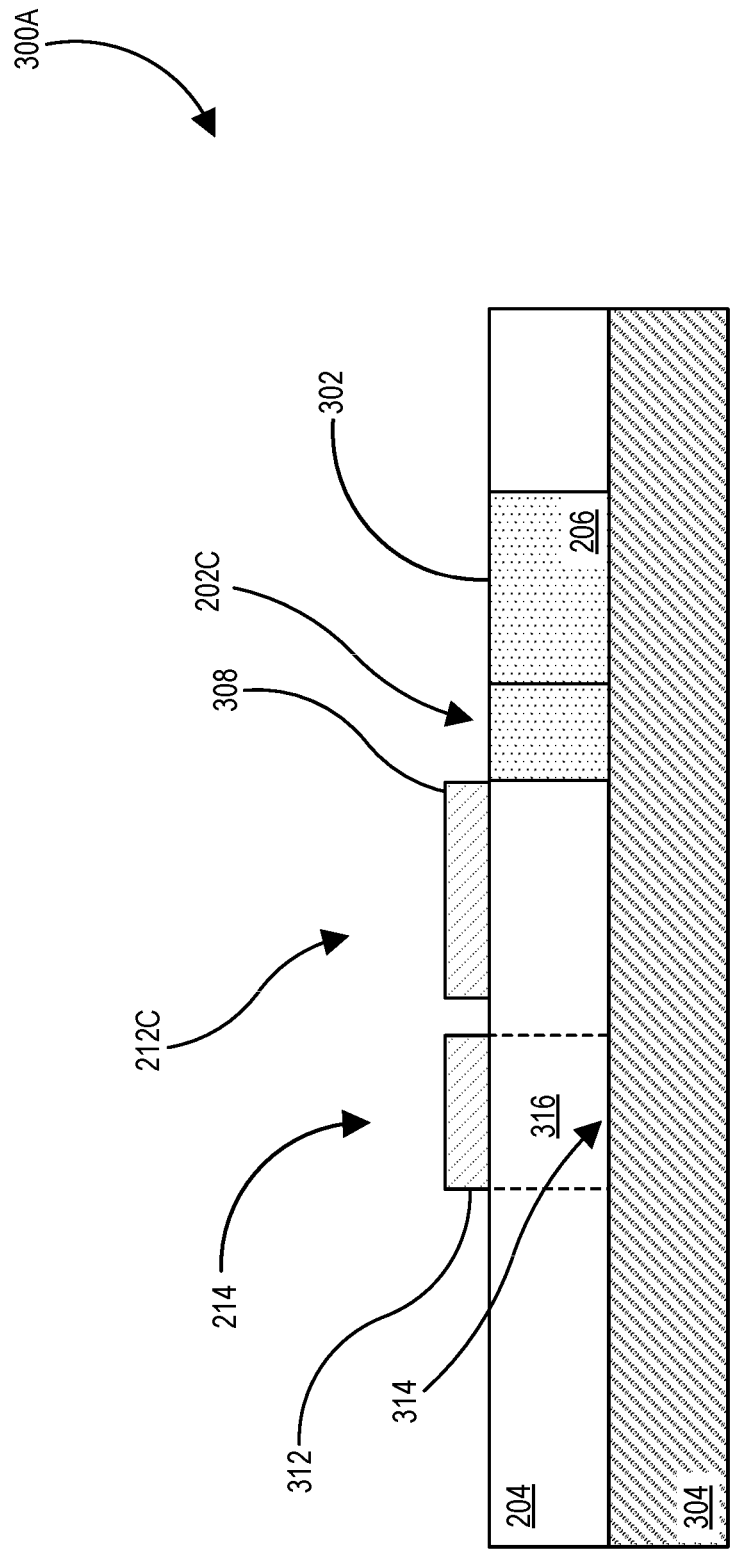
FIG. 3A illustrates a non-limiting first example of a cross-section taken along the line A-A of FIG. 2A according to one or more embodiments.

FIG. 3A illustrates a non-limiting first example of a cross-section 300A of the tetron 200A taken along the line A-A of FIG. 2A according to one or more embodiments. Several features of the first cross-section 300A correspond to the features described with respect to FIG. 2A so description thereof is omitted for brevity. Cross-sections that include the vortex regions 202 and the gates 212 are substantially similar to the first cross-section 300A, so description of the first cross-section 300A apply to those cross-sections in corresponding embodiments. In one or more embodiments, the vortex region 202C in the first cross-section 300A is a cavity that extends from an upper surface 302 of the second region 206 and to an upper surface of a three-dimensional topological insulator layer 304. In some embodiments, the upper surface of the three-dimensional topological insulator layer 304 is exposed in the vortex region 202C.

The gate 212C is adjacent to the peripheral portion 208 of the vortex region 202C and the edge 210. In some embodiments, a portion of the gate 212C is adjacent to the edge 210 of the second region 206 at the peripheral portion 208. The gate 212C is adjacent to the vortex region 202C and is located on the first region 204. In some embodiments, the gates 212 are located directly on the first region 204. In some embodiments, one or more additional regions of insulator material, which is not necessarily magnetic insulator material, may be positioned between the gates 212 and the first region 204 to improve electromagnetic isolation between the three-dimensional topological insulator layer 304 and the gate 212.

Each of the gates 212 is individually and selectively tunable to adjust electromagnetic characteristics of the gate 212 the first region 204. For instance, voltage can be applied to each of the gate 212 to selectively promote or inhibit transfer of an MZM from adjacent vortex regions 202 to the quantum dot region 214. Tuning the gate regions 212 may include, by way of non-limiting example, applying a voltage having a known amplitude for a certain time period (e.g., a voltage pulse), applying a sequence of voltage pulses having two or more different amplitudes and/or time periods, applying a time-varying voltage to the gates 212 (e.g., a voltage having a sinusoidal waveform), or a modulated voltage (e.g., amplitude modulated, frequency modulated, pulse width modulated).

The gates 212 are operated (e.g., via application of an external magnetic mode) to selectively control transmission characteristics of the gates 212 and/or the first region 204 to achieve a desired level of transmission (e.g., electron transmission) between the vortex regions 202 and the quantum dot region 214. More specifically, the gates 212 control the chemical potential in the first region 204. As a result of individually tuning the gate 212C via application of electromagnetic energy to a Dirac point in the edge spectrum, tunneling across the three-dimensional topological insulator 304 is blocked and transmission between the vortex region 202C and the quantum dot region 214 is prevented. As a result of individually tuning the gate 212C away from the Dirac point, tunneling across the three-dimensional topological insulator 304 is activated and transmission may be activated or permitted between the vortex region 202C and the quantum dot region 214. The surface of the three-dimensional topological insulator 304 is, in at least some embodiments, in contact with the first region 204 of magnetic insulator material and a chemical potential is provided in a band gap area of the three-dimensional topological insulator 304. In operation, activation of the gate 212C transfers a chemical potential outside of the band gap area, activating conduction in at least a portion of the quantum dot region 214, and thus forming a quantum dot. Various transmission settings can be achieved in the first region 204 based on the desired quantum computing application.

The quantum dot region 214 includes a gate region 312 that is selectively tunable to adjust electromagnetic characteristics in or around the quantum dot region 214. The gate region 312 may be controlled in a manner similar to the gates 212—for example, by applying a voltage to or modulating a voltage on the gate region 312. The gate region 312 may be controlled in concert or in connection with control of one or more of the gate regions 212 to transfer an MZM in the vortex region 212C to the quantum dot region 214. For instance, in a given time period, voltages may be applied to the gate region 212C and to the gate region 312. As a result of transferring an MZM from the vortex region 202C to the quantum dot region 214 adjacent to the gate 212C, an area of the three-dimensional topological insulator 304 adjacent to the gate 212C becomes conductive and forms a quantum dot at a surface 314 of the three-dimensional topological insulator 304 beneath the gate region 312. In some embodiments, an area 316 between the gate region 312 and the three-dimensional topological insulator 304 may include an insulator material other than the insulator material of the first region 204.

Two-dimensional topological insulators ("2DTI") are characterized by a single $\mathbb{Z}_2$ topological invariant. In 2DTIs, electrons are effectively confined to a two-dimensional system (e.g., 2D electron gas) and then the gap forms in a two-dimensional system. Edges of the two-dimensional topological insulator have conducting modes as a result of the bulk electron structure being gapped. By contrast, the three-dimensional topological insulator 304 is characterized by four single $\mathbb{Z}_2$ topological invariants per band gap. As a result, surfaces of the three-dimensional topological insulator 304 have conducting modes and electrons can move in a three-dimensional system.

The three-dimensional topological insulator layer 304 is, in some embodiments, a thin slab of a three-dimensional topological insulator material that includes material of Group 3 and/or Group 5 elements, according to the old periodic table group classifications by the International Union of Pure and Applied Chemistry (IUPAC) prior to 1990. Examples of appropriate Group 3 and 5 elements include Gallium, Bismuth, Arsenic, and Antimony. In some embodiments, the three-dimensional topological insulator layer is a thin slab of a three-dimensional topological insulator material that includes Group 2 and/or Group 6 elements. Non-limiting examples of appropriate Group 2 and 6 elements include mercury, selenium, and tellurium. Group 2 and/or Group 6 elements may be preferable for fabrication of the topological insulator layer 304 relative to Group 3 and Group 5 elements in some instances. For example, Group 2 and Group 6 elements may improve magnetic insulator characteristics of the topological insulator layer 304 relative to Group 3 and 5 elements. As another example, Group 2 and Group 6 elements may improve one or more structural characteristics of the topological insulator layer 304 relative to Group 3 and 5 elements, which may improve density of tetrons/hexons produced. Specific non-limiting examples of topological insulator material include $Cd_2As_3$, BiTe, BiSe, HgTe, and BiSbTeSe.

Figure 3B:
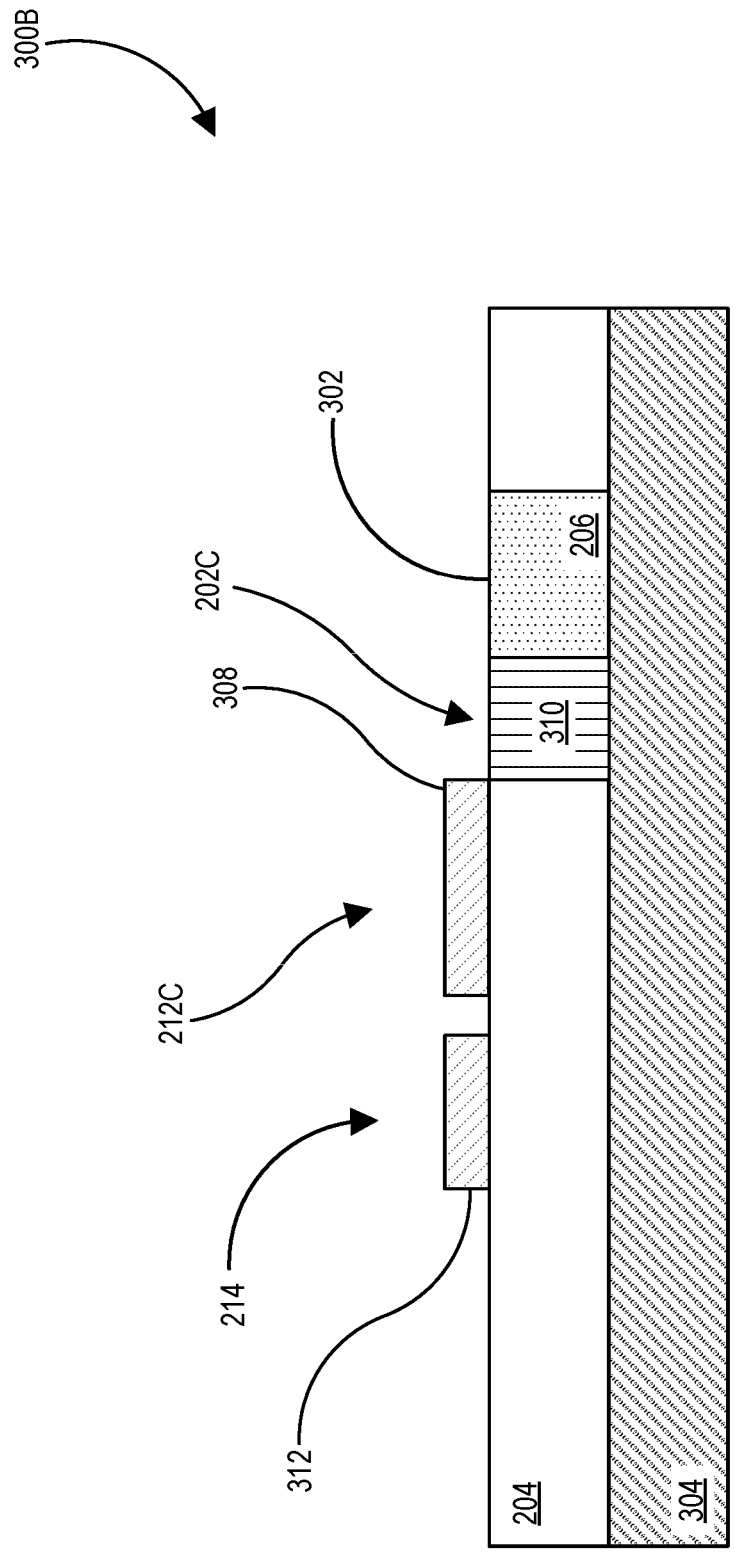
FIG. 3B illustrates a non-limiting second example of a cross-section 300B taken along the line A-A of FIG. 2A according to one or more embodiments.

FIG. 3B illustrates a non-limiting second example of a cross-section 300B taken along the line A-A of FIG. 2A according to one or more embodiments. Several features of the second cross-section 300B correspond to the features described with respect to the first cross-section 300A so description thereof is omitted for brevity. In the second cross-section 300B, the vortex region 202C includes a region of material 310 that has different electromagnetic properties than the superconductor material of the second region 206 surrounding the vortex region 202C. For instance, the material 310 may have a different permeability or permittivity than the superconductor material surrounding the vortex region 202C. The region of material 310 extends through the second region 206 to the topological insulator layer 304. In some embodiments, a bottom surface of the material 310 is in contact with an upper surface of the three-dimensional topological insulator layer 304. A cross-sectional shape of the region of material 310 may be circular, rectangular, or polygonal, as described with respect to FIG. 1 and elsewhere herein.

In some embodiments, the circular cavity described with respect to FIG. 3A and elsewhere may be filled with the material 310 to achieve the second cross-section 300B. In some embodiments, the material 310 may be a modified version of the superconductor material of the second region 206. For instance, the material 310 may be a region of the superconductor that is weaker in superconductivity, that has a higher atomic disorder than the rest of the second region 206, or that has a material deficiency relative to the second region 206. The electromagnetic characteristics of the material 310 help to selectively entrap electromagnetic flux in the vortex region 202C. The material 310 may be formed, by way of non-limiting example by chemical etching, by cold wet etching, or by dry etching.

Figure 3C:
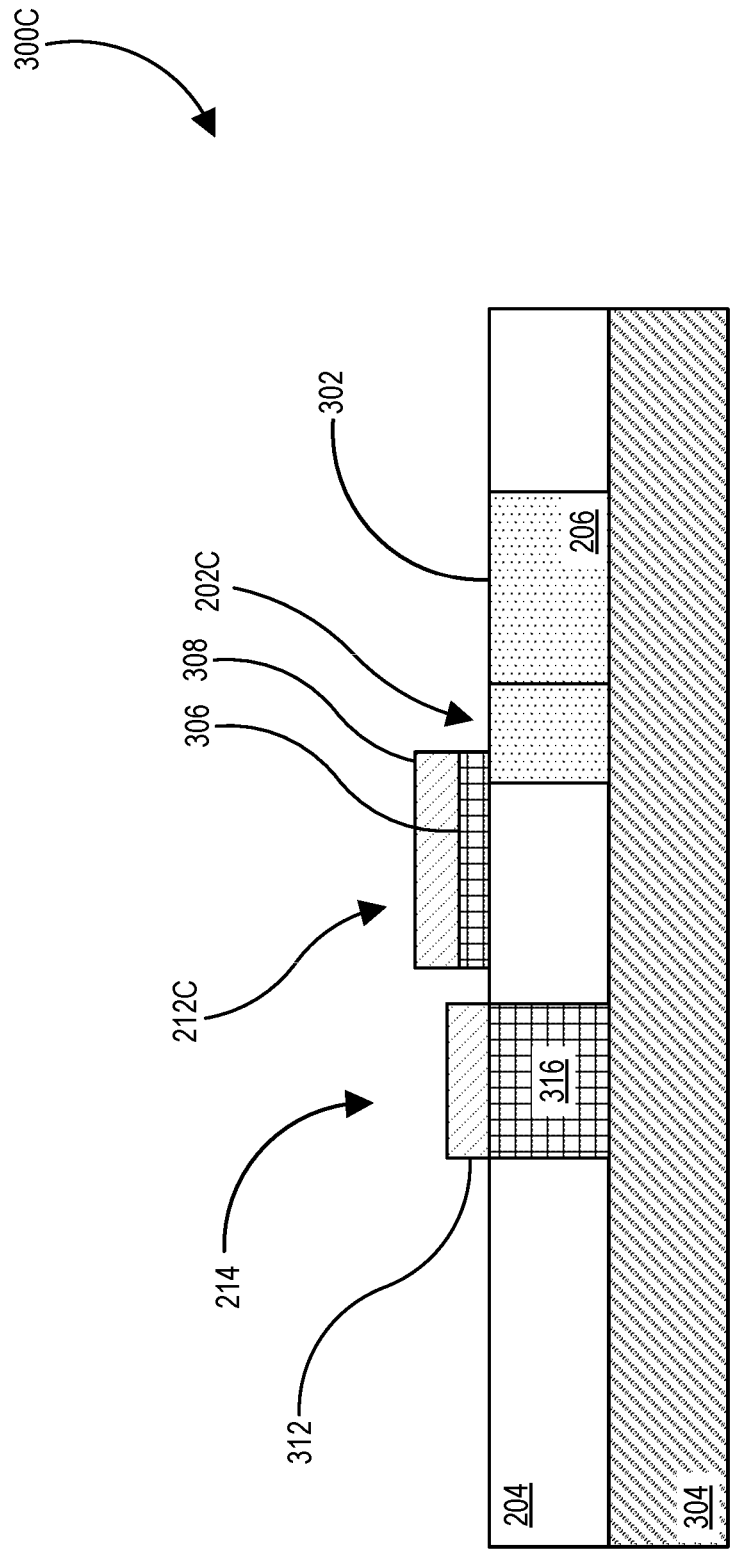
FIG. 3C illustrates a non-limiting third example of a cross-section 300C taken along the line B-B of FIG. 2B according to one or more embodiments

FIG. 3C illustrates a non-limiting third example of a cross-section 300C of the tetron 200B taken along the line B-B of FIG. 2B according to one or more embodiments. Several features of the third cross-section 300C correspond to the features described with respect to the tetron 200A and the cross-section 300A so description thereof is omitted for brevity. Cross-sections that include the vortex regions 202 and the gates 212 are substantially similar to the first cross-section 300C, so description of the first cross-section 300C apply to those cross-sections in corresponding embodiments.

The gate 212C overlaps a portion of the vortex region 202C at the edge 210 (see FIG. 2B). The gate 212C of the cross-section 300C includes an insulator region 306 disposed on a surface of the first region 204 and a gate region 308 on the insulator region 306. The insulator region 306 is a region of electric insulator material, magnetic insulator material, or both. The insulator region 306 separates and electromagnetically insulates the gate region 308 from the superconductor material of the first region 204.

In some embodiments, the tetron 200A and/or 200B may include a third region 316 of insulator material that is different than the insulator material of the first region 204. By way of non-limiting example, the third region 316 may be formed of a conventional electrical insulator material, such as a dielectric material (e.g., silicon dioxide, barium titanate), whereas the first region 204 may be formed of a magnetic insulator material (e.g.,, Yttrium barium copper oxide, nickel iron alloys, iron (III) oxide). The third region 316 may have a substantially similar thickness as the first region 204.

The relative dimensions of the regions and layers shown in FIGS. 3A, 3B, and 3C are for ease of illustration and do not necessarily correspond to the relative thicknesses and dimensions of commercial embodiments. Some layers or regions may have different thicknesses than others. For instance, the first region 204 may have a different thickness than the second region 206. The first region 204 may have a different thickness than the three-dimensional topological insulator layer 304, as another example.

In some embodiments, the tetron 200A and/or the tetron 200B include one or more additional insulation layers disposed on the first region 204 and one or more additional gate regions disposed on the one or more additional insulation layers. In such embodiments, the one or more additional gate regions can be operated (e.g., via electromagnetic modulation) to tune portions of the three-dimensional topological insulator layer 304 and/or the magnetic insulator material of the first region to a desired conductance regime, e.g., to facilitate or prevent tunneling.

Figure 4:
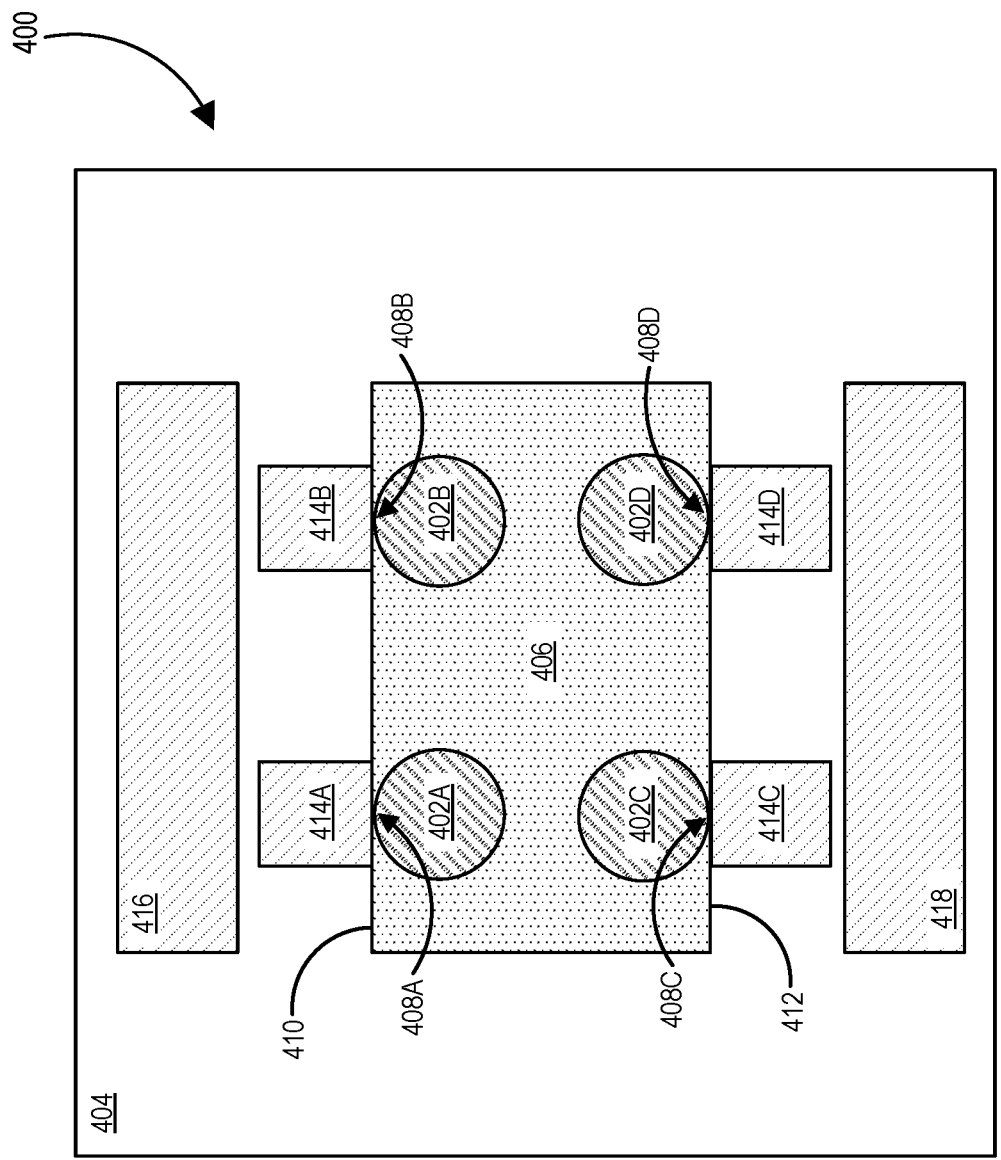
FIG. 4 illustrates a top view of a two-sided tetron of a quantum computing processor according to one or more embodiments.

FIG. 4 illustrates a top view of a two-sided tetron 400 that is a qubit architecture of a quantum computing processor according to one or more embodiments. Several features of the two-sided tetron 400 are substantially similar to the qubit element 100 and/or the one-sided tetrons 200A, 200B so description thereof is omitted for brevity. The tetron 400 is a multilayer structure that is operable to selectively entrap electromagnetic flux in four vortex regions 402A, 402B, 402C, and 402D (collectively "vortex regions 402"). The tetron 400 includes a first region 404 of a magnetic insulator material and a second region 406 of a superconductor material.

The vortex regions 402A and 402B respectively include peripheral portions 408A and 408B on or at a first edge 410 of the second region 406. The vortex regions 402C and 402D respectively include peripheral portions 408C and 408D on or at a second edge 412 of the second region 406 opposite to the first edge 410. In some embodiments, one or more of the peripheral portions 408 of the vortex regions 402A and 402B include a thin wall or thin-walled portion that is thinner than other walls of the second region 406 between the vortex regions 402A and 402B and an exterior of the second region 406. In some embodiments, one or more of the peripheral portions 408 of the vortex regions 402A and 402B include an aperture extending through the second region 406 to the first region 404. In some embodiments, one or more of the peripheral portions 408 include an aperture and one or more of the peripheral portions 408 include a thin wall. As a result, precision in the fabrication process of the tetron 400 may be reduced without significantly altering performance of the tetron 400.

The two-sided tetron 400 also includes a first pair of gate regions 414A and 414B that are respectively adjacent to the vortex regions 402A and 402B on or at the first edge 410 of the second region 406. The two-sided tetron 400 further includes a second pair of gate regions 414C, and 414D that are respectively adjacent to the vortex regions 402C and 402D on or at the second edge 412 of the second region 406. The vortex regions 402A, 402B, 402C, 402D are spaced apart from each other such that an electromagnetic field in one of the vortex regions 402 is insulated from an adjacent vortex region 402.

The two-sided tetron 400 further includes a first quantum dot region 416 extending along a first direction (e.g., a horizontal direction) of the tetron 400. The gate regions 414A and 414B are disposed between the first quantum dot region 416 and the vortex regions 402A and 402B, respectively. The two-sided tetron 400 also includes a second quantum dot region 418 extending along the first direction in parallel with the first quantum dot region 416. The gate regions 414C and 414D are disposed between the second quantum dot region 418 and the vortex regions 402C and 402D, respectively. The gate regions 414A, 414B, 414C, 414D are tunnel barriers that are selectively and individually controllable to transition between a first state and a second state, as described with respect to FIG. 2A and elsewhere herein.

Figure 5:
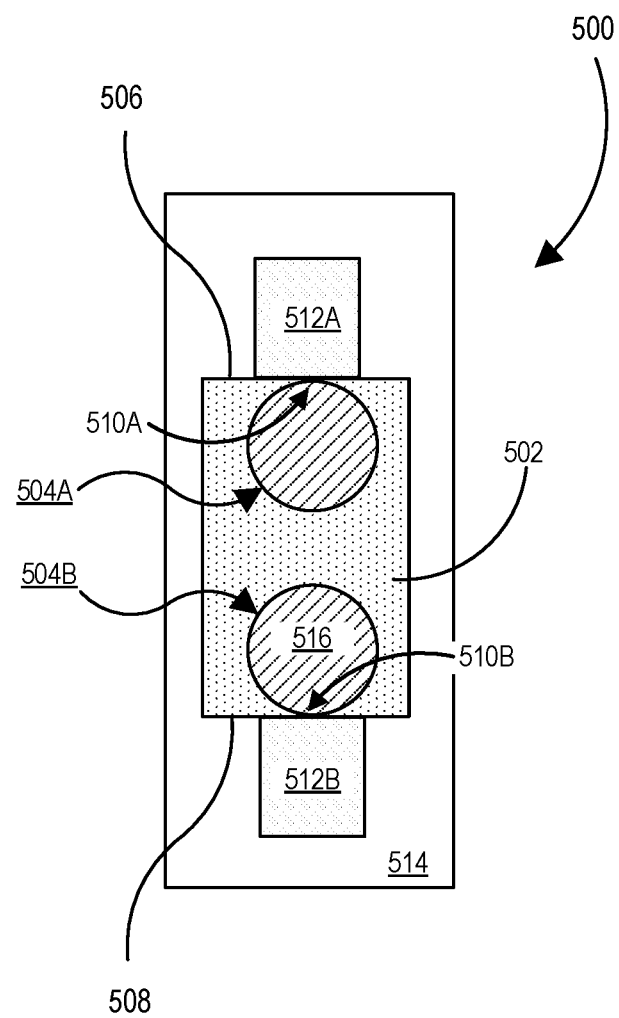
FIG. 5 illustrates a top view of a Fu wire according to one or more embodiments.

FIG. 5 illustrates a top view of a Fu wire 500 according to one or more embodiments herein. The Fu wire 500 is an interconnect element that facilitates the transfer of information between different Majoranas. The Fu wire 500 includes a first region 502 of superconductor material, a first vortex region 504A positioned at a first edge 506 of the first region 502, and a second vortex region 504B positioned at a second edge 508 opposite to the first edge 506. The Fu wire 500 is a coherent interconnect between different parts of a quantum processor. The Fu wire 500 enables a quantum state to be transferred from a first quantum structure (e.g., a first tetron, a first hexon) to a second quantum structure (e.g., a second tetron, a second hexon) that is otherwise isolated from the first quantum structure. In operation of a quantum processor that includes the Fu wire 500, connection of quantum states between the first and second vortex regions 504A and 504B is enabled by a charging state of the first region 502. As a result of the charging energy of the first region 502 of superconducting material becoming sufficiently large, an MZM in the first vortex region 504A is coupled with the second vortex region 504B, and visa versa.

The first vortex region 504A of the Fu wire 500 includes a peripheral portion 510A on or at the first edge 506. The second vortex region 504B of the Fu wire 500 includes a peripheral portion 510B on or at the second edge 508. In some embodiments, the peripheral portions 510A and 510B are apertures or holes in the respective edges 506 and 508 of the first region 502. In some embodiments, the peripheral portions 510A and 510B are thin-walled portions of the first region 502.

The Fu wire 500 also includes two gates 512A and 512B (collectively "gates 512") that are respectively adjacent to the vortex regions 504A and 504B on or at the respective first and second edges 506 and 508 of the first region 502. Each of the gates 512 is a tunnel barrier that is selectively and individually controllable to transition between a first state and a second state, the first state in which an MZM in an adjacent vortex region 504 is insulated or prevented from tunneling through the three-dimensional topological insulator 514, and the second state in which an MZM in an adjacent vortex region 504 is permitted to tunnel through the three-dimensional topological insulator 514. In some embodiments, one or both of the gates 512A and 512B overlap the peripheral portions 510A and 510B, as described elsewhere herein.

The Fu wire 500 includes a second region 514 of magnetic insulator material and a three-dimensional topological insulator 516. The gates 512 and the first region 502 of superconducting material are disposed on the three-dimensional topological insulator 516. The vortex regions 504A and 504B extend through the first region 502 to the three-dimensional topological insulator 516. The arrangement of the regions and layers of the Fu wire 500 are substantially similar to the cross-sections 300A, 300B, and/or 300C described with respect to FIGS. 3A, 3B, and 3C. In some embodiments, one or both of the vortex regions 504A and 504B may include a region of material that has different electromagnetic properties than the superconductor material of the first region 502 surrounding the vortex regions 504A, 504B, as described with respect to the material 310 of FIG. 3B.

Figure 6:
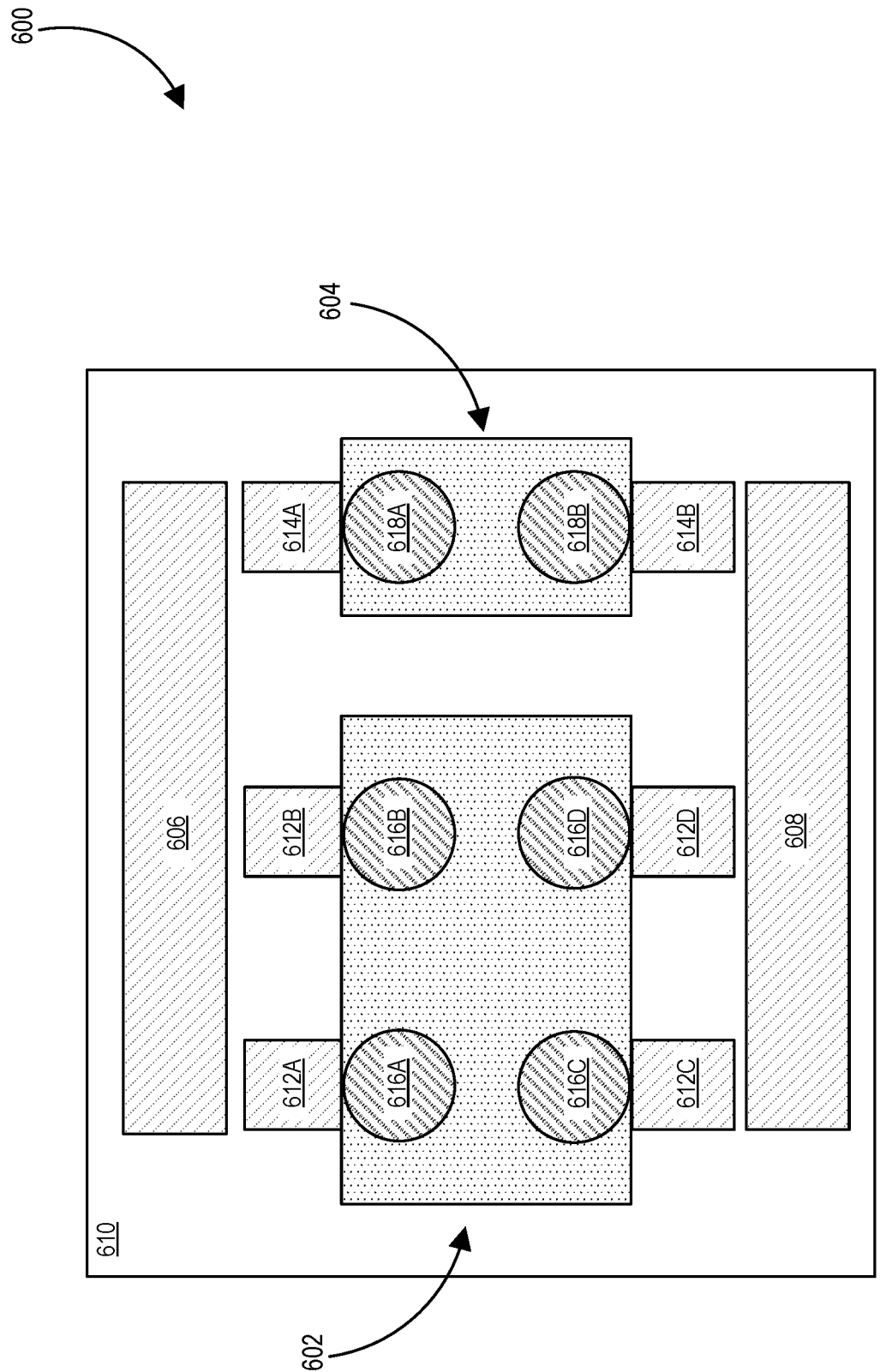
FIG. 6 illustrates a top view of an interconnected two-sided tetron according to one or more embodiments.

FIG. 6 shows a top view of an interconnected two-sided tetron 600 that is a qubit architecture according to one or more embodiments. The interconnected two-sided tetron 600 includes a two-sided tetron 602, a Fu wire 604, a first quantum dot 606, and a second quantum dot 608 on a region 610 of magnetic insulator material. The two-sided tetron 602 and the Fu wire 604 are substantially similar to the two-sided tetron 400 and the Fu wire 500, respectively. The first quantum dot 606 extends from gate regions 612A and 612B on a first side of the tetron 602 to a gate region 614A of the Fu wire 604. The second quantum dot 608 extends from gate regions 612C and 612D on a second side of the tetron 602 to a gate region 614B of the Fu wire 604.

A single qubit measurement of MZMs of the tetron 602 can be performed by selective operation of the gate regions 612 and the gate regions 614. For instance, to measure a qubit corresponding to the MZMs of a vortex region 616A and a vortex region 616D, tunneling in the gate regions 612A, 614A, 612D, and 614B is activated. Single qubit measurements of adjacent MZMs (e.g., MZMs of the vortex regions 616A and 616B, MZMs of the vortex regions 616C and 616D) can be achieved by further subdividing the first and second quantum dots 606 and 608 between the adjacent vortex regions. Each of the vortex regions 616 include peripheral portions at an edge of a superconducting region of the tetron 602, as described with respect to FIGS. 2 and 4 and elsewhere herein.

Figure 7:
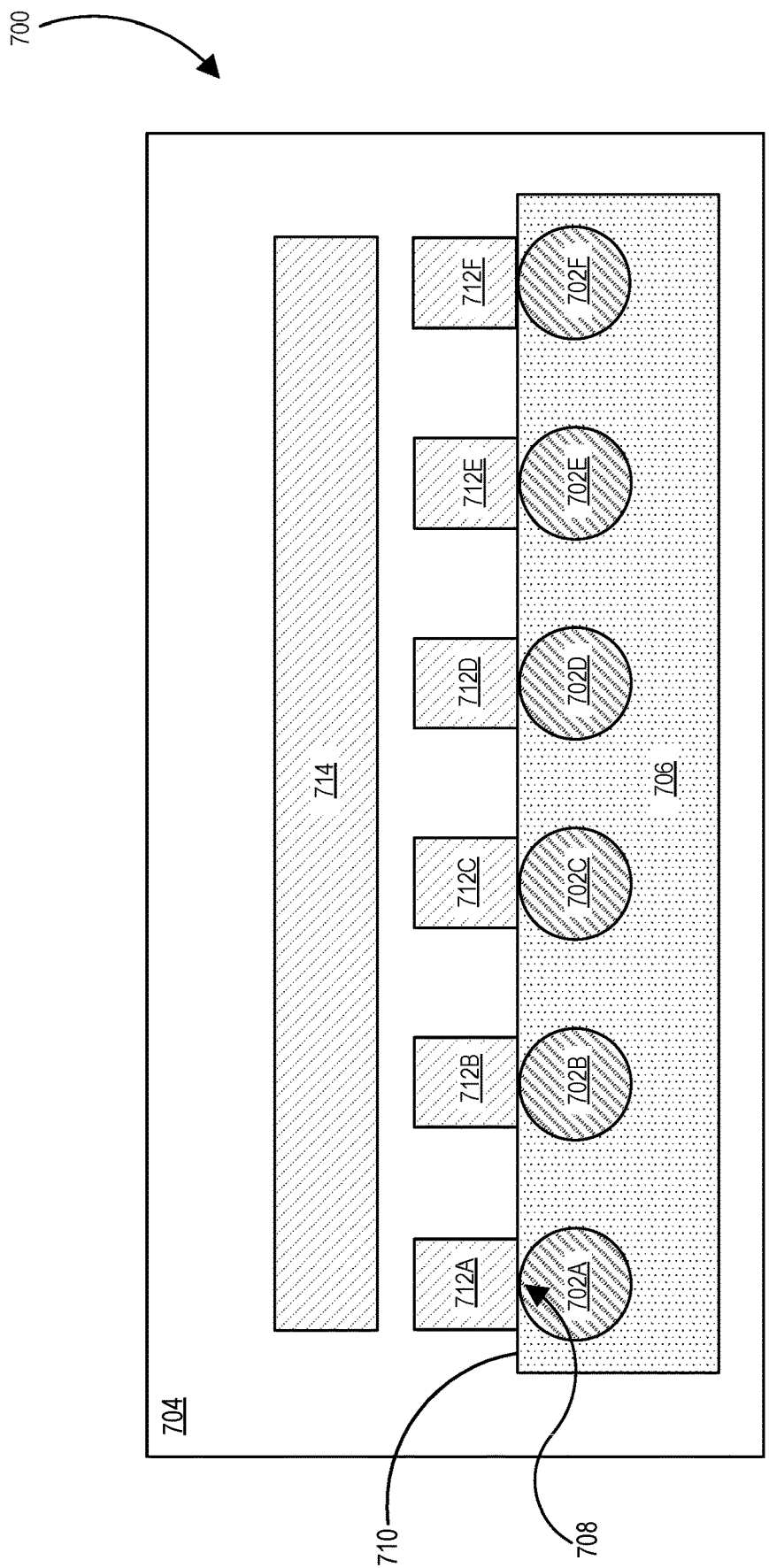
FIG. 7 illustrates a top view of a one-sided hexon of a quantum processor according to one or more embodiments.

FIG. 7 illustrates a top view of a one-sided hexon 700 that is a qubit architecture of a quantum processor according to one or more embodiments. The hexon 700 is a multilayer structure that is operable to selectively entrap electromagnetic flux in six vortex regions 702A, 702B, 702C, 702D, 702E, and 702F (collectively "vortex regions 702").

Several features of the hexon 700 are substantially similar to the tetron 200A and other aspects described herein so repeated description thereof is omitted for brevity. The hexon 700 includes a first region 704 of magnetic insulator material and a second region 706 of superconductor material. Each of the vortex regions 702 includes a peripheral portion 708 on or at an edge 710 of the second region 706. The second region 706 extends in a first direction (e.g., horizontally as shown) along the first region 704. In some embodiments, one or more of the peripheral portions 708 of the vortex regions 702 include a thin wall or thin-walled portion that is thinner than other walls of the second region 706 between the vortex regions 702 and an exterior of the second region 706. In some embodiments, one or more of the peripheral portions 708 of the vortex regions 702 include an aperture extending through the second region 706 to the first region 704. In some embodiments, one or more of the peripheral portions 708 include an aperture and one or more of the peripheral portions 708 include a thin wall. As a result, precision in the fabrication process of the hexon 700 may be reduced without significantly altering performance of the hexon 700.

The hexon 700 also includes six gate regions 712A, 712B, 712C, 712D, 712E, and 712F (collectively "gate regions 712") that are respectively adjacent to the vortex regions 702A, 702B, 702C, 702D, 702E, and 702F on or at the edge 710 of the second region 706. The vortex regions 702 are arranged along the first direction and spaced apart from each other such that an electromagnetic field in one of the vortex regions 702 is insulated from an adjacent vortex region 702. The hexon 700 further includes a quantum dot region 714 extending along the first direction with the gate regions 712 between the quantum dot region 714 and the vortex regions 702. The structure and operation of the gate regions 712 and the quantum dot region 714 are substantially similar to the gates 212 and the quantum dot region 214 and other aspects described herein. The quantum dot region 714 may be subdivided into two or more quantum dot regions to enable measurement of two MZMs of the hexon 700 in a single measurement period.

Figure 8:
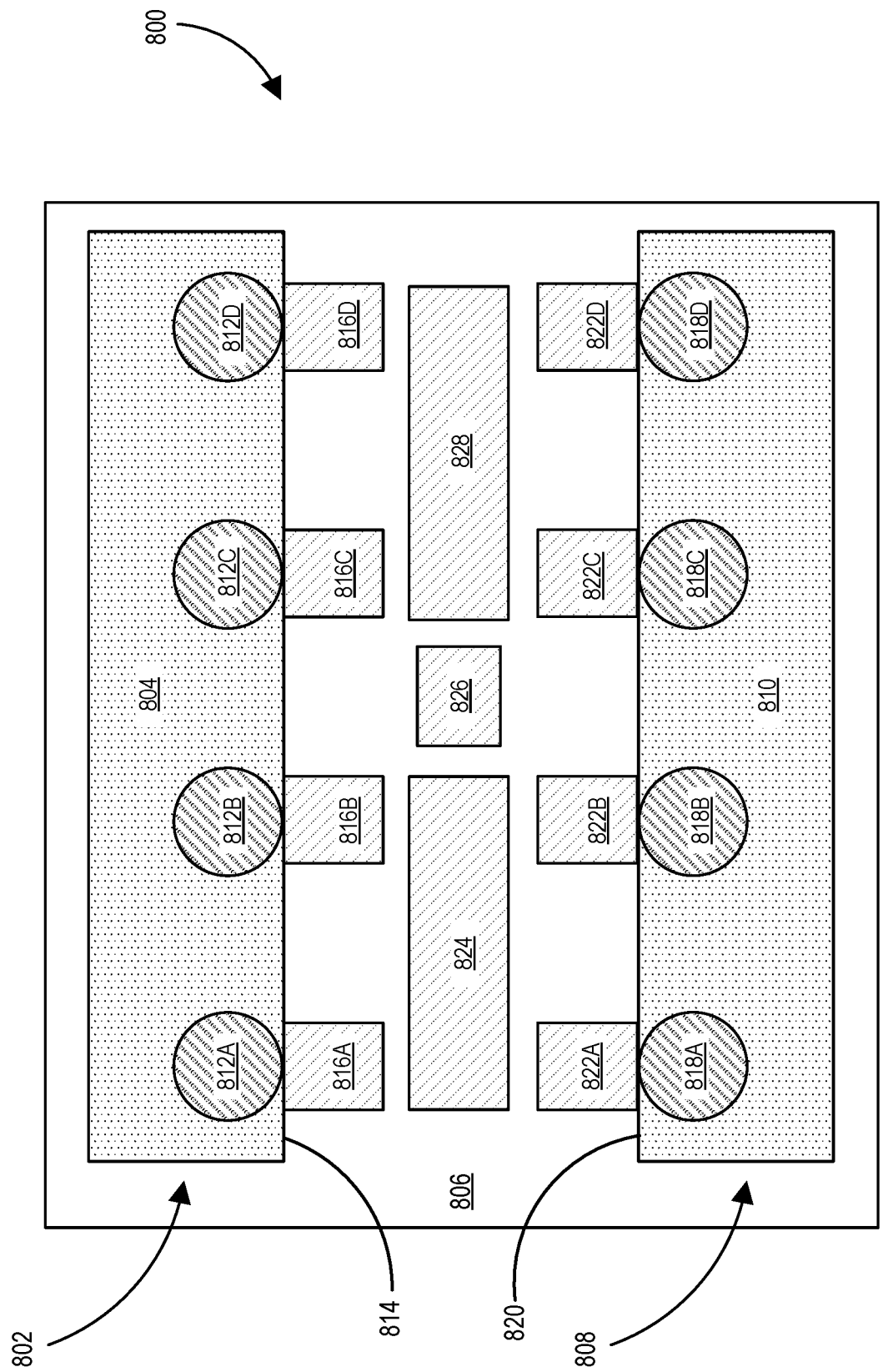
FIG. 8 illustrates a top view of a configuration for implementing quantum computing operations involving a pair of one-sided tetrons according to one or more embodiments.

FIG. 8 shows a top view of a configuration 800 of a qubit architecture for implementing quantum computing operations involving a pair of one-sided tetrons according to one or more embodiments. The configuration 800 includes a first tetron 802 having a first region 804 of superconductor material provided on a second region 806 of magnetic insulator material. The configuration 800 also includes a second tetron 808 having a third region 810 of superconductor material provided on the second region 806.

The first tetron 802 has four vortex regions 812A, 812B, 812C, and 812D (collectively "vortex regions 812") provided on a first edge 814 of the first region 804. The first tetron 802 also includes four gate regions 816A, 816B, 816C, and 816D (collectively "gate regions 816") that are respectively adjacent to the vortex regions 812A, 812B, 812C, and 812D at or on the first edge 814. The second tetron 808 has four vortex regions 818A, 818B, 818C, and 818D (collectively "vortex regions 818") provided on a second edge 820 of the third region 810. The second tetron 808 also includes four gate regions 822A, 822B, 822C, and 822D (collectively "gate regions 822") that are respectively adjacent to the vortex regions 818A, 818B, 818C, and 818D at or on the second edge 820. The second edge 820 of the third region 810 opposes the first edge 814 of the first region 804. Each of the vortex regions 812 and 818 include a peripheral portion at an edge of a superconducting region of a hexon, as described with respect to FIGS. 2, 4, 7, 8, and elsewhere herein.

The configuration 800 further includes a first quantum dot 824, a gate region 826 adjacent to the first quantum dot 824, and a second quantum dot 828 adjacent to the first gate region 826. The first quantum dot 824, the gate region 826, and the second quantum dot 828 are arranged along a first direction of the configuration 800 (e.g., the horizontal direction) between the first tetron 802 and the second tetron 808.

The configuration 800 may be controlled to perform various operations involving quantum states of qubits. For instance, to perform a single-qubit measurement of MZMs in the vortex regions 812A and 812B, tunneling in the gate regions 816A and 816B is activated or opened and a measurement is performed on the first quantum dot 824. To perform a single-qubit measurement of MZMs in the vortex regions 818B and 816D, tunneling in the gate regions 816D, 822B, and 826 is activated or opened.

As another non-limiting example, to perform a single-qubit rotation of MZMs in the vortex regions 812A and 812B, tunneling in the gate regions 816A and 816B is activated or opened and a gate on the first quantum dot 824 is modulated. As a further example, to perform a single-qubit rotation of MZMs in the vortex regions 812A and 812B, tunneling in the gate region 816A is activated or opened and the gate region 816B is modulated for a period of time sufficient for qubit rotation.

As yet another non-limiting example, to perform a two-qubit measurement of MZMs in the vortex regions 812A, 812D, 818A, and 818C, tunneling in the gate regions 816A, 816D, 822A, and 822C is activated or opened and both the first quantum dot 824 and the second quantum dot 826 are measured. In some implementations, to perform a lower fidelity two-qubit measurement of MZMs in the vortex regions 812A, 812D, 818A, and 818C, tunneling in the gate regions 816A, 816D, 822A, 822C, and 826 is activated or opened and one of the first quantum dot 824 and the second quantum dot 826 is measured. The various gate regions of the first and second tetrons 802 and 808 can be operated in connection with the gate region 826 to implement a universal set of quantum logic gates. Other operations involving the gate regions and/or the first and second quantum dots 824 and 826 as desired to perform quantum computing operations and measurements.

Figure 9:
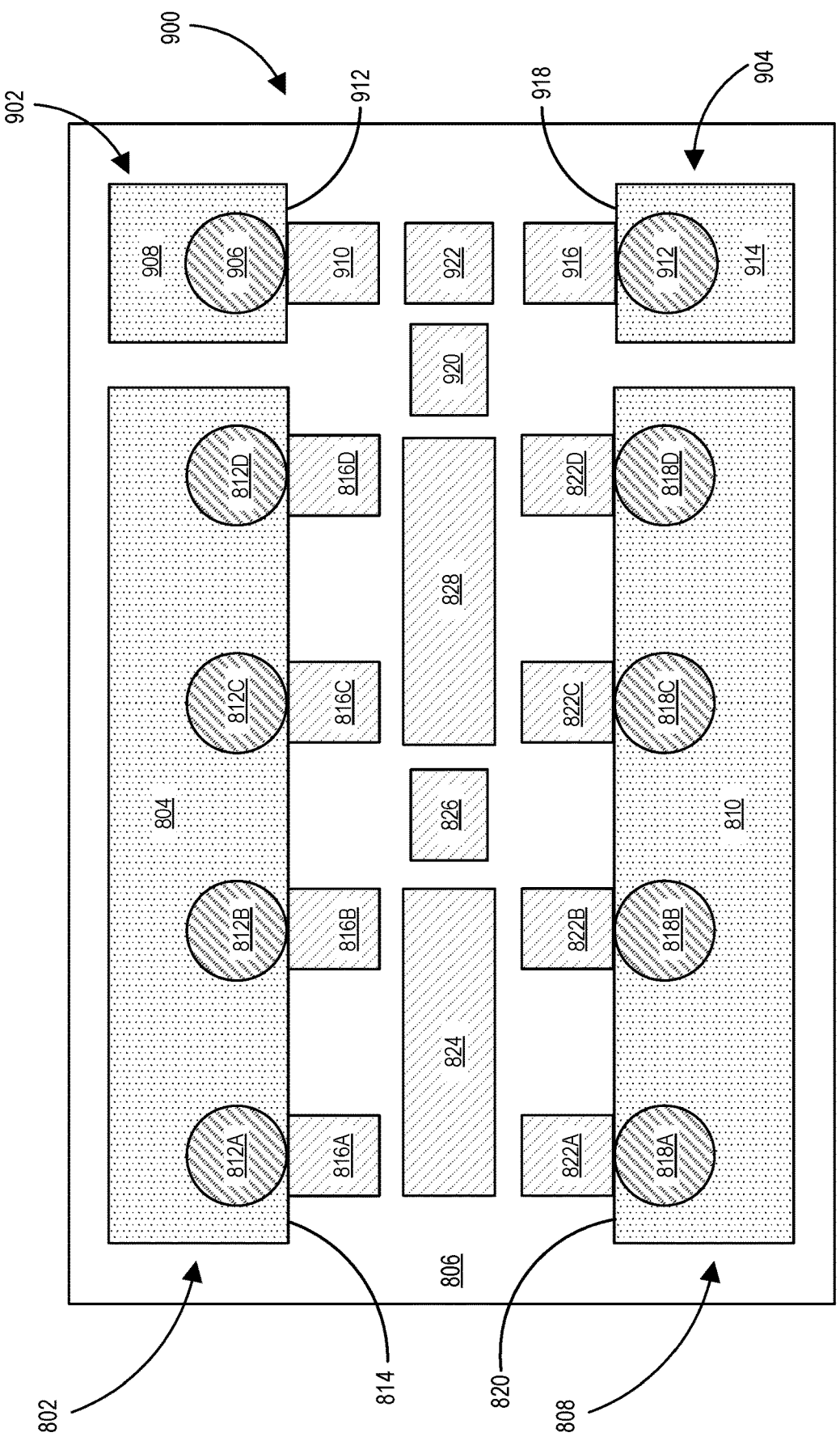
FIG. 9 illustrates a top view of a configuration for implementing quantum computing operations involving a pair of one-sided tetrons according to one or more embodiments.

FIG. 9 shows a top view of a configuration 900 of a qubit architecture for implementing quantum computing operations involving the pair of one-sided tetrons according to one or more embodiments, as discussed with respect to FIG. 8 and elsewhere. More particularly, the configuration 900 includes the first tetron 802, the second tetron 808, the first quantum dot 824, the first gate region 826, and the second quantum dot 828. The configuration 900 also includes a first Fu wire portion 902 adjacent to the first tetron 802 along the first direction and includes a second Fu wire portion 904 adjacent to the second tetron 808 along the first direction. The first Fu wire portion 902 is one half (e.g., the lower half) of a first Fu wire and the second Fu wire portion 904 is one half (e.g., the upper half) of a second Fu wire.

The first Fu wire portion 902 includes a vortex region 906 on a third region 908 of superconductor material on the second region 806. The first Fu wire portion 902 also includes a first gate region 910 adjacent to the vortex region 906 at an edge 912 of the third region 908. The vortex region 906 includes a peripheral portion at the edge 912 as described with respect to FIG. 2A and elsewhere herein. The second Fu wire portion 904 includes a vortex region 912 on a fourth region 914 of superconductor material on the second region 806. The second Fu wire portion 904 also includes a second gate region 916 adjacent to the vortex region 912 at an edge 918 of the fourth region 814. The vortex region 912 includes a peripheral portion at the edge 918 as described with respect to FIG. 2A and elsewhere herein. The edge 912 of the third region 908 opposes the edge 918 of the fourth region 914.

The configuration 900 further includes a second gate region 920 adjacent to the second quantum dot 828, and a third gate region 922 adjacent to the second gate region 920. The gate regions 816, 822, 826, 820, 910, 916, and 922 can be selectively operated to connect MZMs of tetrons in different portions of a quantum processor to perform quantum measurements and operations. By way of non-limiting example, an MZM of the vortex region 812B may be connected to a quantum dot structure in a different portion (not shown) of a quantum processor by activating tunneling in the gate portions 816B, 826, 920, 922, and 910. In some implementations, tunneling in some of the gate portions 816B, 826, 920, 922, and 910 may be successively activated to connect the MZM to a different portion of the configuration 900. In some implementations, one or both of the first quantum dot 824 and the second quantum dot 828 may be modulated in connection with or as a part of connecting the MZM.

Figure 10:
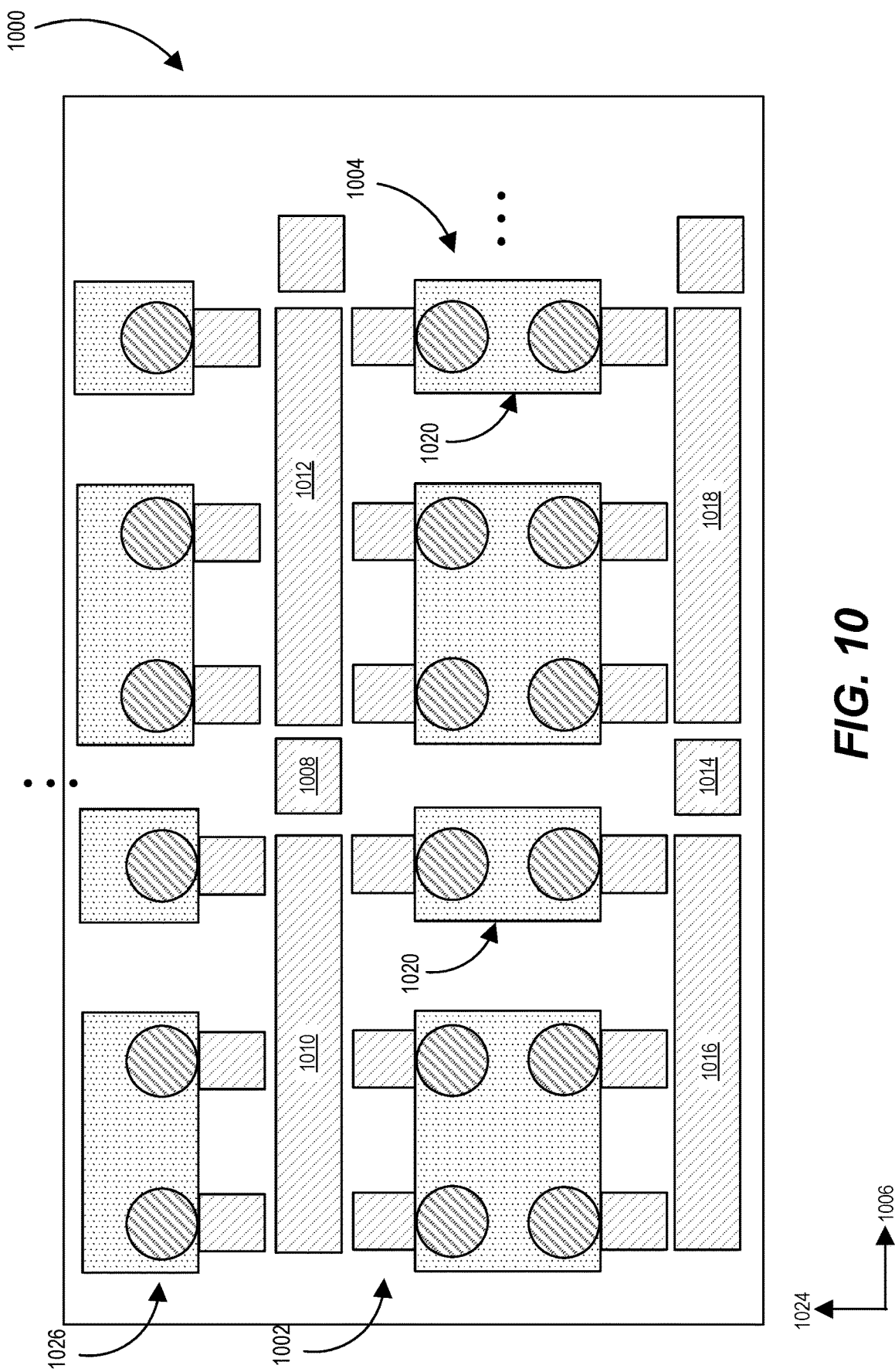
FIG. 10 illustrates a top view of a two-dimensional array of interconnected two-sided tetrons according to one or more embodiments.

FIG. 10 illustrates a top view of an array 1000 of interconnected two-sided tetrons of a qubit architecture according to one or more embodiments. Each of the two-sided tetrons shown corresponds to the two-sided tetron 600 discussed with respect to FIG. 6. The array 1000 includes a first two-sided tetron 1002 and a second two-sided tetron 1004 adjacent to the first tetron 1002 in a first direction 1006. The array 1000 includes a first gate region 1008 positioned between a first quantum dot 1010 of the first tetron 1002 and a first quantum dot 1012 of the second tetron 1012. The array 1000 also includes a second gate region 1014 positioned between a second quantum dot 1016 of the first tetron 1002 and a second quantum dot 1018 of the second tetron 1004.

Tunneling through the first gate region 1008 can be activated or opened to connect MZMs in the first quantum dots 1010 and 1012 of the first and second tetrons 1002 and 1004. Tunneling through the second gate region 1014 can be activated or opened to connect MZMs of the second quantum dots 1016 and 1018 of the first and second tetrons 1002 and 1004. Additional two-sided tetrons of the array 1000 may continue along the first direction 1006 to create a tetron array of a desired size. Fu wires 1020 and 1022 respectively of the first and second tetrons 1002 and 1004 may be operated to connect MZMs of the first and second quantum dots of the first and second tetrons 1002 and 1004.

The array 1000 may be scaled to a desired size by adding interconnected one-sided tetrons in the first direction 1006 and/or the second direction 1024. For instance, a third one-sided tetron 1026 (only the lower half shown) may be positioned on a side of the first quantum dot 1010 opposite to the one-sided tetron 1002 to expand the array 1000 in the second direction. In some embodiments, the array 1000 may be comprised of two-sided hexons instead of two-sided tetrons.

Figure 11:
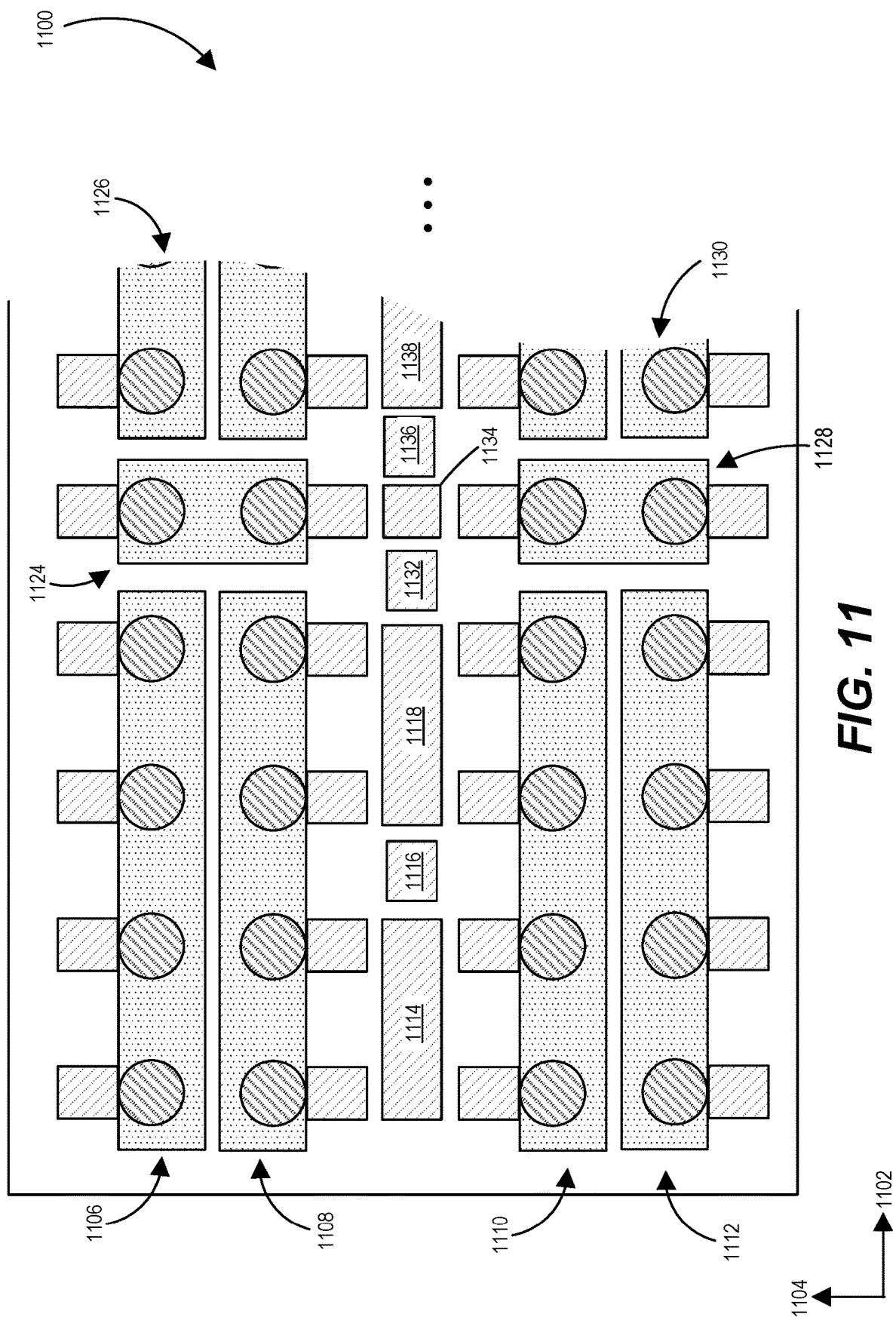
FIG. 11 illustrates a top view of a two-dimensional array of one-sided tetrons according to one or more embodiments.

FIG. 11 shows a top view of a two-dimensional array 1100 of one-sided tetrons of a qubit architecture according to one or more embodiments. The array 1100 includes a plurality of one-sided tetrons arranged in columns along a first direction 1102 and a plurality of one-sided tetrons arranged in rows along a second direction 1104 orthogonal to the first direction 1102. Pairs of adjacent one-sided tetrons in the second direction 1104 are separated by quantum dots and gate regions. For example, a first column of one-sided tetrons includes tetrons 1106, 1108, 1110, and 1112 arranged along the second direction 1104. A first quantum dot 1114, a first gate region 1116, and a second quantum dot 1118 are positioned between the tetron 1108 and the tetron 1110 in the first direction 1104.

Fu wires separate one-sided tetrons arranged along the first direction 1102. For instance, a Fu wire 1124 is positioned between the tetron 1106 and a one-sided tetron 1126 along the first direction 1102 and a Fu wire 1128 is positioned between the tetron 1112 and a one-sided tetron 1130 along the first direction 1102. The array 110 further includes a second gate region 1132 and a third gate region 1134 positioned between the Fu wires 1120 and 1124. The second and third gate regions 1132 and 1134 can be controlled in connection with control of the Fu wires 1124 and 1128 to connect MZMs of one-sided tetrons and quantum dots in different rows. For instance, tunneling in the second and third gate regions 1132 and 1134 may be activated in connection with operation of the Fu wire 1124 to connect an MZM on the second quantum dot with a quantum dot (not shown) operably coupled to the one-sided tetron 1106.

Additional gate regions and quantum dots may be controlled to connect MZMs with other one-sided tetrons arranged along the first direction 1102. The array 1100, for example, includes a fourth gate region 1136 adjacent to the third gate region 1134 in the first direction 1002 and a third quantum dot 1138 adjacent to the fourth gate region 1136 in the first direction 1102. Tunneling in the second, third, and fourth gate regions 1132, 1134, and 1136 may be activated to connect an MZM of the second quantum dot 1118 with the fourth quantum dot 1138. This architecture may be repeated in the first direction 1002 and/or the second direction 1004 as desired to scale the size of the array 1100. In some embodiments, the array 1100 may be comprised of one-sided hexons instead of one-sided tetrons.

Advantageously, the architectures of the array 1000 and the array 1100 facilitate more versatile and efficient fabrication. In particular, the structures shown herein combine widely available two-dimensional fabrication techniques with beneficial charging energy protection of a topological insulator architecture. The architectures proposed utilize a two-dimensional pattern of superconducting proximity effect in conjunction with the magnetic proximity effect to create topological qubits. The architectures and methods of operation described herein also enable universal quantum computing using a full set of quantum logic gates.

FURTHER EMBODIMENTS

In various embodiments herein, the present disclosure include qubit elements, qubit architectures, and quantum processors. The following embodiments may be implemented alone or in different combinations and may further be embodied with other features described herein.

Some embodiments of the present disclosure include a quantum processor, comprising a three-dimensional topological insulator layer; a superconductor region disposed on the three-dimensional topological insulator layer; and a vortex region extending through the superconductor region to the three-dimensional topological insulator layer and having a peripheral portion located on an edge of the superconductor region.

In some embodiments, the quantum processor comprises a gate region adjacent to the peripheral portion at the edge, the gate region being selectively tunable to activate tunneling in the three-dimensional topological insulator layer.

In some embodiments, the superconductor region includes a thin wall at the peripheral portion, the thin wall facilitating transfer of a Marjorana zero mode from the vortex region to an exterior of the superconductor region. In some embodiments, the superconductor region includes an aperture at the peripheral portion.

In some embodiments, the vortex region includes a cavity extending through the superconductor region to a surface of the three-dimensional topological insulator layer.

In some embodiments, the vortex region includes a region of material extending through the superconductor region, the material having a different electromagnetic characteristic than a superconductor material of the superconductor region.

In some embodiments, the quantum processor comprises a magnetic insulator region disposed on the three-dimensional topological insulator layer and at least partially surrounding the superconductor region. In some embodiments, the quantum processor comprises a quantum dot region that includes a first gate region extending in the first direction on the magnetic insulator region; and a second gate region disposed on the magnetic insulator region and positioned between the first gate region and the superconductor region, the superconductor region extending in the first direction. In some embodiments, the superconductor region is adjacent to the magnetic insulator region on the three-dimensional topological insulator.

Some embodiments of the present disclosure include a qubit architecture comprising a three-dimensional topological insulator layer; a first superconductor region on the three-dimensional topological insulator layer; a first plurality of vortex regions extending through the first superconductor region to the three-dimensional topological insulator layer; and a first plurality of peripheral portions of the first plurality of vortex regions located at a first edge of the first superconductor region.

In some embodiments, one or more of the first plurality of peripheral portions include a thin wall that facilitates transfer of a Marjorana zero mode of a vortex region of the plurality of vortex regions to an exterior of the first superconductor region. In some embodiments, one or more of the first plurality of peripheral portions include an aperture extending through the first edge of the first superconductor region.

In some embodiments, each of the plurality of vortex regions include a cavity extending through the first superconductor region to a surface of the three-dimensional topological insulator layer.

In some embodiments, one or more of the plurality of vortex regions include a region of material extending through the first superconductor region, the material having a different electromagnetic characteristic than a superconductor material of the first superconductor region. In some embodiments, the qubit architecture comprises a plurality of gate regions positioned on the first edge of the first superconductor region and adjacent to the first plurality of peripheral portions.

In some embodiments, the qubit architecture comprises a second plurality of vortex regions extending through the first superconductor region to the three-dimensional topological insulator layer; and a second plurality of peripheral portions of the second plurality of vortex regions located on a second edge of the first superconductor region.

In some embodiments, the qubit architecture comprises a magnetic insulator layer on the three-dimensional topological insulator layer; a quantum dot region extending along and spaced apart from the first edge; and a plurality of gate regions on the magnetic insulator layer, the plurality of gate regions positioned between the quantum dot region and the first plurality of peripheral portions.

In some embodiments, the qubit architecture comprises a second superconductor region on the three-dimensional topological insulator layer; and a second plurality of vortex regions extending through the second superconductor region to the three-dimensional topological insulator layer; and a second plurality of peripheral portions of the second plurality of vortex regions located on a second edge of the second superconductor region.

In some embodiments, the qubit architecture comprises a quantum dot region extending along and spaced apart from the first edge; a Fu wire; and a first set of gate regions positioned on a side of the first superconductor region and configured to selectively couple the Fu wire to a vortex region of the first plurality of vortex regions. In some embodiments, the Fu wire includes a second superconductor region disposed on the three-dimensional topological insulator; a second plurality of vortex regions extending through the second super conductor region to the three-dimensional topological insulator layer; and a second set of gate region positioned on a side of the second superconductor region and configured to selectively couple the Fu wire to the quantum dot region.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. It is understood that the proportions and relative positions of objects and features herein may be provided for ease of description and/or illustration and are not intended to be limiting. Other arrangements, embodiments, implementations, and equivalents will be evident to those skilled in the art and may be employed without departing from the spirit and scope of the present disclosure as set forth in the following claims.

What is claimed is:

1. A quantum processor, comprising:
a three-dimensional topological insulator layer;
a superconductor region disposed on the three-dimensional topological insulator layer; and
a vortex region extending through the superconductor region to the three-dimensional topological insulator layer and having a peripheral portion located on an edge of the superconductor region, wherein the vortex region includes a cavity extending through the superconductor region to a surface of the three-dimensional topological insulator layer.

2. The quantum processor of claim 1, further comprising:
a gate region adjacent to the peripheral portion at the edge, the gate region being selectively tunable to activate tunneling in the three-dimensional topological insulator layer.

3. The quantum processor of claim 1, wherein the superconductor region includes a thin wall at the peripheral portion, the thin wall facilitating transfer of a Marjorana zero mode from the vortex region to an exterior of the superconductor region.

4. The quantum processor of claim 1, further comprising:
an aperture in the superconductor region at the peripheral portion.

5. The quantum processor of claim 1, further comprising:
a magnetic insulator region disposed on the three-dimensional topological insulator layer and at least partially surrounding the superconductor region.

6. The quantum processor of claim 5, further comprising:
a quantum dot region that includes a first gate region that extends in a first direction on the magnetic insulator region; and
a second gate region disposed on the magnetic insulator region and positioned between the first gate region and the superconductor region, wherein the superconductor region extends in the first direction.

7. The quantum processor of claim 5, wherein the superconductor region is adjacent to the magnetic insulator region on the three- dimensional topological insulator.

8. A qubit architecture, comprising:
a three-dimensional topological insulator layer;
a first superconductor region on the three-dimensional topological insulator layer;
a first plurality of vortex regions extending through the first superconductor region to the three-dimensional topological insulator layer; and
a first plurality of peripheral portions of the first plurality of vortex regions located at a first edge of the first superconductor region, wherein each of the first plurality of vortex regions include a cavity extending through the first superconductor region to a surface of the three-dimensional topological insulator layer.

9. The qubit architecture of claim 8, wherein one or more of the first plurality of peripheral portions include a thin wall that facilitates transfer of a Marjorana zero mode of a vortex region of the first plurality of vortex regions to an exterior of the first superconductor region.

10. The qubit architecture of claim 8, wherein one or more of the first plurality of peripheral portions include an aperture extending through the first edge of the first superconductor region.

11. The qubit architecture of claim 8, further comprising:
a plurality of gate regions positioned on the first edge of the first superconductor region and adjacent to the first plurality of peripheral portions.

12. The qubit architecture of claim 8, further comprising:
a second plurality of vortex regions extending through the first superconductor region to the three-dimensional topological insulator layer; and
a second plurality of peripheral portions of the second plurality of vortex regions located on a second edge of the first superconductor region.

13. The qubit architecture of claim 8, further comprising:
a magnetic insulator layer on the three-dimensional topological insulator layer;
a quantum dot region extending along and spaced apart from the first edge; and
a plurality of gate regions on the magnetic insulator layer, the plurality of gate regions positioned between the quantum dot region and the first plurality of peripheral portions.

14. The qubit architecture of claim 8, further comprising:
a second superconductor region on the three-dimensional topological insulator layer; and
a second plurality of vortex regions extending through the second superconductor region to the three-dimensional topological insulator layer; and
a second plurality of peripheral portions of the second plurality of vortex regions located on a second edge of the second superconductor region.

15. The qubit architecture of claim 8, further comprising:
a quantum dot region extending along and spaced apart from the first edge;
a Fu wire; and
a first set of gate regions positioned on a side of the first superconductor region and configured to selectively couple the Fu wire to a vortex region of the first plurality of vortex regions.

16. The qubit architecture of claim 15, wherein the Fu wire includes:
a second superconductor region disposed on the three-dimensional topological insulator;
a second plurality of vortex regions extending through the second super conductor region to the three-dimensional topological insulator layer; and
a second set of gate region positioned on a side of the second superconductor region and configured to selectively couple the Fu wire to the quantum dot region.

17. A quantum processor, comprising:
a three-dimensional topological insulator layer;
a superconductor region disposed on the three-dimensional topological insulator layer; and
a vortex region extending through the superconductor region to the three-dimensional topological insulator layer and having a peripheral portion located on an edge of the superconductor region, wherein the vortex region includes a cavity extending through the superconductor region to a surface of the three-dimensional topological insulator layer, and wherein the cavity is fillable with a material having a different electromagnetic characteristic than a superconductor material of the superconductor region.

18. The quantum processor of claim 17, further comprising:
a gate region adjacent to the peripheral portion at the edge, the gate region being selectively tunable to activate tunneling in the three-dimensional topological insulator layer.

19. The quantum processor of claim 17, further comprising:
a magnetic insulator region disposed on the three-dimensional topological insulator layer and at least partially surrounding the superconductor region.

20. The quantum processor of claim 19, further comprising:
a quantum dot region that includes a first gate region that extends in a first direction on the magnetic insulator region; and
a second gate region disposed on the magnetic insulator region and positioned between the first gate region and the superconductor region, wherein the superconductor region extends in the first direction.

\* \* \* \* \*